(12) United States Patent
Cho (10) Patent No.: US 6,490,186 B2
(45) Date of Patent: Dec. 3, 2002

(54) APPARATUS FOR SUPPLYING AUXILIARY POWER TO PORTABLE ELECTRONIC DEVICES

(75) Inventor: Young-Tack Cho, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/993,515

(22) Filed: Nov. 27, 2001

(65) Prior Publication Data

US 2002/0085403 A1 Jul. 4, 2002

(30) Foreign Application Priority Data

Jan. 4, 2001 (KR) ................................. 01-294

(51) Int. Cl.⁷ ............................................... H02M 1/00
(52) U.S. Cl. ...................................................... 363/146
(58) Field of Search ................................ 363/144, 146; 320/107, 114; 307/64, 66, 70

(56) References Cited

U.S. PATENT DOCUMENTS

| | | | |
|---|---|---|---|
| 4,748,344 A | | 5/1988 | Sing |
| 5,272,459 A | * | 12/1993 | Geery .......................... 336/61 |
| 5,680,026 A | | 10/1997 | Lueschen |
| 5,923,146 A | | 7/1999 | Martensson |
| 5,923,147 A | | 7/1999 | Martensson |
| 6,254,832 B1 | * | 7/2001 | Rainin et al. ................ 422/100 |

FOREIGN PATENT DOCUMENTS

| | | |
|---|---|---|
| JP | 63-266761 | 11/1988 |
| JP | 4-176241 | 6/1992 |
| JP | 10-023679 | 1/1998 |
| JP | 10-150484 | 6/1998 |
| JP | 11-221783 | 8/1999 |
| KR | 1994-01372 | 6/1994 |
| KR | 1999-035754 | 9/1999 |
| KR | 1999-037347 | 10/1999 |
| KR | 1999-085923 | 12/1999 |
| KR | 2000-049190 | 7/2000 |
| WO | WO94/11909 | 5/1994 |

* cited by examiner

Primary Examiner—Matthew Nguyen
(74) Attorney, Agent, or Firm—Robert E. Bushnell, Esq.

(57) ABSTRACT

An apparatus for supplying auxiliary power to a portable electric device includes a casing, a battery removably accommodated in the casing, a winding unit winding and unwinding an electric wire through which electric power from the battery is supplied to the electric device, rotating forward and backward in the casing, and a contact member provided in the winding unit, including a movable contact electrically connected to the electric wire, and a secured contact electrically connected to the battery and constantly contacted with the movable contact. With this configuration, there is provided an apparatus for supplying auxiliary power to portable electric devices, which can be promptly connected to the portable electric devices and supply electric power thereto, and is convenient to carry.

20 Claims, 8 Drawing Sheets

APPARATUS FOR SUPPLYING AUXILIARY POWER TO PORTABLE ELECTRONIC DEVICES

CLAIM OF PRIORITY

This application makes reference to, incorporates the same herein, and claims all benefits accruing under 35 U.S.C. §119 from an application for APPARATUS FOR SUPPLYING AUXILIARY POWER SOURCE TO PORTABLE ELECTRIC DEVICES earlier filed in the Korean Industrial Property Office on Jan. 4, 2001 and there duly assigned Serial No. 2001-294.

BACKGROUND OF THE INVENTION

1. Field of the Invention

The present invention relates to an apparatus for providing auxiliary power and more particularly an apparatus for supplying auxiliary power to portable electronic devices.

2. Description of the Related Art

There are various portable electronic devices such as a notebook computer, a portable telephone, a PDA (Personal Digital Assistant), etc. These portable electronic devices provide a user with the convenience that the user can use the electronic devices everywhere, by employing a rechargeable battery. The employment of these portable electric devices is increasing in line with an information-oriented society, the technology of the portable electric devices is developing rapidly.

Though these portable electric devices have the merits of good portability, it has the shortcoming of a limited running time according to a charge of the battery. Accordingly, a user carries another auxiliary battery with him or her, and if the battery is discharged, the user changes the exhausted battery into the auxiliary one. At this time, the exhausted battery should be changed after separating it from the portable electronic device, thereby making the battery exchange time-consuming and complicated.

Further, for carrying the auxiliary battery, the user needs to use a bag or a pocket of clothes, thereby making the user inconvenienced.

Exemplars of the art are Korean Patent No. 1994-13732 issued to Chung, for Recharging Apparatus for a Portable Wireless Phone, Korean Patent No. 1999-0035754 issued to Chung, for Power Supply Apparatus for a Computer Monitor, Korean Patent No. 1999-0037347 issued to Youn, for Auxiliary Power Supply Apparatus for a Wireless Phone, Korean Patent No. 1999-0085923 issued to Shim, for Auxiliary Power Supply Apparatus for a Wireless Phone, Korean Patent No. 2000-049190 issued to Snyder, for Beltholder Having Auxiliary Battery, U.S. Pat. No. 4,748,344 issued to Sing, for Portable Power Supply Carrier, U.S. Pat. No. 5,680,026 issued to Lueschen, for Tool Belt with Battery Assembly, U.S. Pat. No. 5,923,146 issued to Martensson, for Battery Charging Unit Incorporated in a Power Cord Reel Housing, U.S. Pat. No. 5,923,147 issued to Martensson, for Battery Charger Unit Incorporated in a Power Cord Reel Housing, PCT Publication No. WO94/11909 by Scheid, for Sliding Battery Door Having Belt Clip Thereon for Portable Electronic Devices, Japanese Patent No. 63-266761 issued to Iwasaki et al., for Portable Battery Case, Japanese Patent No. 4-176241 issued to Sato et al., for Portable Telephone Set Incorporated with Belt, Japanese Patent No. 10-23679 issued to Matsumoto, for Portable Electronic Equipment, Japanese Patent No. 10-150484 issued to Sakata, for Holder for Portable Telephone Set and Portable Telephone Set with Hook, and Japanese Patent No. 11-221783 issued to Spotnitz, for Portable Power Tool Having Low Rate, Rechargeable Batteries.

SUMMARY OF THE INVENTION

It is therefore an object of the present invention to provide an apparatus for supplying auxiliary power to a portable electronic device, which can be promptly connected to the portable electric device and supply electric power thereto, and is convenient to carry.

It is another object to have an apparatus for supplying auxiliary power to a portable electronic device that is easy and inexpensive to manufacture.

It is still another object to have an apparatus for supplying auxiliary power that is reliable for use in a portable electronic device.

These and other objects may be accomplished by the provision of an apparatus for supplying auxiliary power to a portable electric device including a casing, a battery removably accommodated in the casing, a winding unit winding and unwinding an electric wire through which electric power from the battery is supplied to the electric device, rotating forward and backward in the casing, and a contact member provided in the winding unit, including a movable contact electrically connected to the electric wire, and a secured contact electrically connected to the battery and constantly contacted with the movable contact.

Here, it is preferable for the apparatus to further include at least one power input part provided in the casing, receiving electric power from an external power source, and a charger including a charging circuit charging the battery with the electric power inputted to the power input part.

Effectively, the power input part includes adapter connection terminals electrically connected to an adapter coupled with the external power source, and charger connection terminals exposed outside the casing, corresponding to power source terminals of a separate charger connected with the external power source.

The winding unit is possible to include a cylindrical winding member winding the electric wire thereon, a rotary shaft by which the winding member is rotated and supported, a rotary spring elastically restoring the winding member to the winding state, and a brake braking the elastic restoring rotation of the winding member.

The winding unit is possible to include a cylindrical winding member winding the electric wire thereon, a rotary knob provided in one side of the winding member, protruding outward the casing, and a rotary shaft by which the winding member is rotated and supported.

Preferably, the apparatus further includes a clip provided at the casing, to be held on a user's belt or the like.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Turning now to the drawings, an apparatus for supplying auxiliary power to portable electronic devices according to the present invention, as shown in FIGS. 1 through 5, includes a casing 10, a battery pack 30 being accommodated in the casing 10, a charger 40 installed in the casing 10, charging a battery 31 (FIG. 6) accommodated in the battery pack 30 with external electric power, an electric wire 3 through which electric power from the battery 31 is transmitted to a portable electronic device 100, a winding unit 50 accommodated in the casing 10, winding and unwinding the electric wire 3, and a contact member 70 electrically connected to the battery 31 and the electric wire 3.

The casing 10 includes a first casing 11 and a second casing 13 combined with each other, and in an inner part of the casing 10 are separately provided a battery accommodation part 15, a charger accommodation part 17, and a winding unit accommodation part 19. Outside of the first casing 11 is provided a clip 21 held on a belt 9 (FIG. 7) of a user or a pocket of clothes thereof, etc. In the part of the second casing 13 corresponding to the battery accommodation part 15 is provided a sliding cover 23 opening and closing the battery accommodation part 15. At this time, it is preferable that the clip 21 is of a belt-clip type held on the belt 9 of the user.

In the battery accommodation part 15 are provided a pair of charging terminal connection parts 25 to which charger connection terminals 47 (to be described later) of a power input part 41 is connected. In the winding unit accommodation part 19 are provided a shaft receiving part 27 to which a rotary shaft 53 of the winding unit 50 is coupled, a wire hole 28 through which the electric wire 3 is drawn out, and a jack hole 29 for receiving a DC (direct current) jack 240 of an external AC (alternating current) adapter 230 therein.

The battery pack 30 includes the battery 31 (FIG. 6) for being charged with electric power and a pack casing 33 surrounding the battery 31. In one side of the pack casing 33 are provided a pair of contact terminals 35 being electrically connected to the charger connection terminals 47. In the other side of the pack casing 33 are provided a pair of contact terminals 85 being connected to a charging circuit substrate 43 of the charger 40.

This battery 31 of the battery pack 30 is charged by the charger 40 being accommodated in the battery accommodation part 15, or by plugging the battery pack 30 in a separate charger 200. In the latter case, the contact terminals 35 of the battery pack 30 correspond to power source terminals 210 of the separate charger 200. Here, it is possible to use as the battery 31 a Ni-MH (Nickel-Metal Hydride) battery or a Li-ion (Lithium-ion) battery generally used in the portable electric devices such as a notebook computer, a portable telephone, a PDA (personal digital assistant), etc.

The charger 40 includes the power input part 41 for connecting to an external power source, and the charging circuit substrate 43 including a charging circuit 44 allowing the battery 31 to be charged with electric power inputted from the power input part 41.

The power input part 41 includes an adapter connection terminal 45 receiving electric power from the AC (alternating current) adapter 230 connected to the external power source 220, and the charger connection terminals 47 receiving electric power from the separate charger 200 connected to the external power source 220.

The adapter connection terminal 45 provided in the casing 10 corresponding to the jack hole 29, is fitted to the DC (direct current) jack 240 of the AC (alternating current) adapter 230 inserted to the jack hole 29 in order to be electrically connected mutually. The adapter connection terminal 45 is also electrically connected to the charging circuit substrate 43.

The charger connection terminals 47 are connected to the charging terminal connection parts 25 of the battery accommodation part 15, exposing outside of the casing 10, and are electrically connected to the charging circuit substrate 43.

These charger connection terminals 47 and the connection terminals 35 of the battery pack 30 are preferably provided to correspond to power source terminals 210 of the separate charger 200 so that the single separate charger 200 can be used compatibly in the auxiliary power apparatus 1 and in the battery pack 30.

The charging circuit substrate 43 is accommodated in the charger accommodation part 17 of the casing 10, and has a pair of contact members 48 for elastically and continuously contacting with a substrate contact terminal 85.

The charging circuit 44 on the charging circuit substrate 43 is electrically connected to the adapter connection terminal 45, the charger connection terminals 47, the contact members 48 and the electric wire 3 toward the portable electric device 100. In the charging circuit substrate 43 is provided a circuit part. The circuit part includes a control part controlling the battery to be charged with electric power from an external power source (AC adapter or charger) through the adapter connection terminal 45 or the charger connection terminals 47, and controlling the charged electric power of the battery 31 to be supplied to the portable electric device 100 through the electric wire 3.

Figure 6:
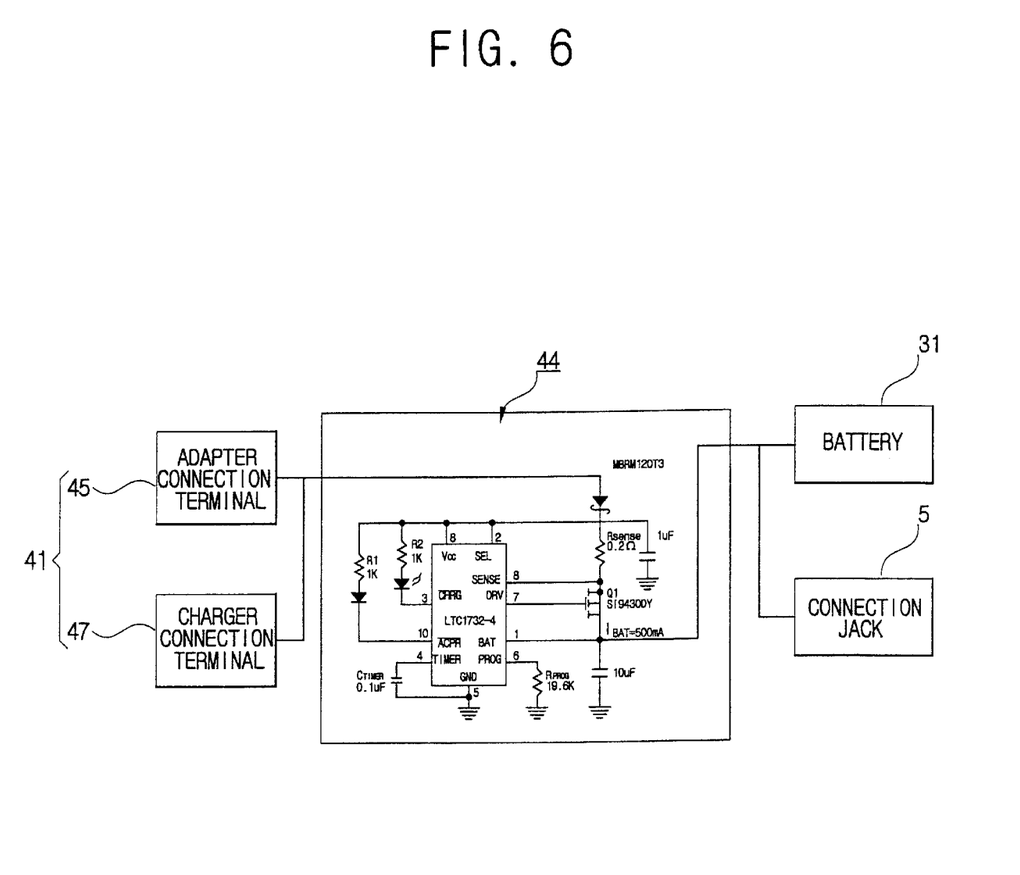
FIG. 6 is a circuit diagram of the apparatus according to the present invention.

The charging circuit 44 on the charging circuit substrate 43 is the same as a charging circuit used in general electric devices, and its embodiment is shown in FIG. 6. The charging circuit 44 may include a charging indicator part indicating a charging state and a charging level of the battery 31, a charging indicator lamp provided outside the casing 10 may be used as the charging indicator part.

One end of the electric wire 3 is secured in a winding member 51 of the winding unit 50 (to be described later), and another free end thereof is drawn out through the wire hole 28 of the casing 10. In the free end of this electric wire 3 is provided a connection jack 5 for connecting with the portable electric device 100.

The winding unit 50 includes the winding member 51 winding and unwinding the electric wire 3, the rotary shaft 53 by which the winding member 51 is rotated and supported, a rotary spring 55 elastically returning the winding member 51 to the winding state, and a brake 56 braking the elastic returning operation of the winding member 51.

The winding member 51 includes a cylindrical main body 61 having an open flank, and a cover 63 blocking up the open flank of the main body 61. Between the blocking part of the main body 61 and the center of the cover 63 is provided a through hole 69 for the rotary shaft 53. The cylindrical surface of the winding member 51 is grooved with a U-shape in order to prevent the electric wire from deviating. In an inner part of the winding member 51 is provided a spring accommodation part 65 accommodating the rotary spring 55.

The rotary shaft 53 passes through the through hole 69, and both end parts thereof are secured in the shaft receiving part 27 on both walls of the winding unit accommodation part 19. Accordingly, the rotary shaft 53 supports the winding member 51 to be rotated forward and backward.

The rotary spring 55 is a spiral spring and is accommodated in the spring accommodation part 65 of the winding member 51. Inside end of the rotary spring 55 is secured on the rotary shaft 53, and outside end thereof is secured on the inside wall of the winding member 51. If the winding member 51 is rotated in a certain direction, the rotary spring 55 is compressed. If this rotary force is suspended, the rotary spring 55 is elastically released, thereby allowing the winding member 51 to be rotated in an inverse direction to the above direction. The rotary spring 55 is installed to be released in a winding direction of the winding member 51.

The brake 56 includes a plurality of brake teeth 66 formed along the circumference of the winding member 51 at the same interval, and a brake button 64 controlling the rotation direction of the winding member 51, being caught and released by the brake teeth 66 according to a pushing operation thereof.

The brake button 64 includes a pushing part 64a protruded outward from the casing 10, 94 and a stopper 64b extended from the pushing part 64a to the brake teeth 66, being caught and released by the brake teeth 66. Here, it is preferable to use a tact button as the brake button 64, capable of being repeatedly pushed and released according to a pushing operation.

The contact member 70 includes a pair of movable contacts 71 coupled to the winding member 51, and a pair of secured contacts 73 secured in the winding unit accommodated part 19 in order to constantly contact with the movable contacts 71.

Figure 1:
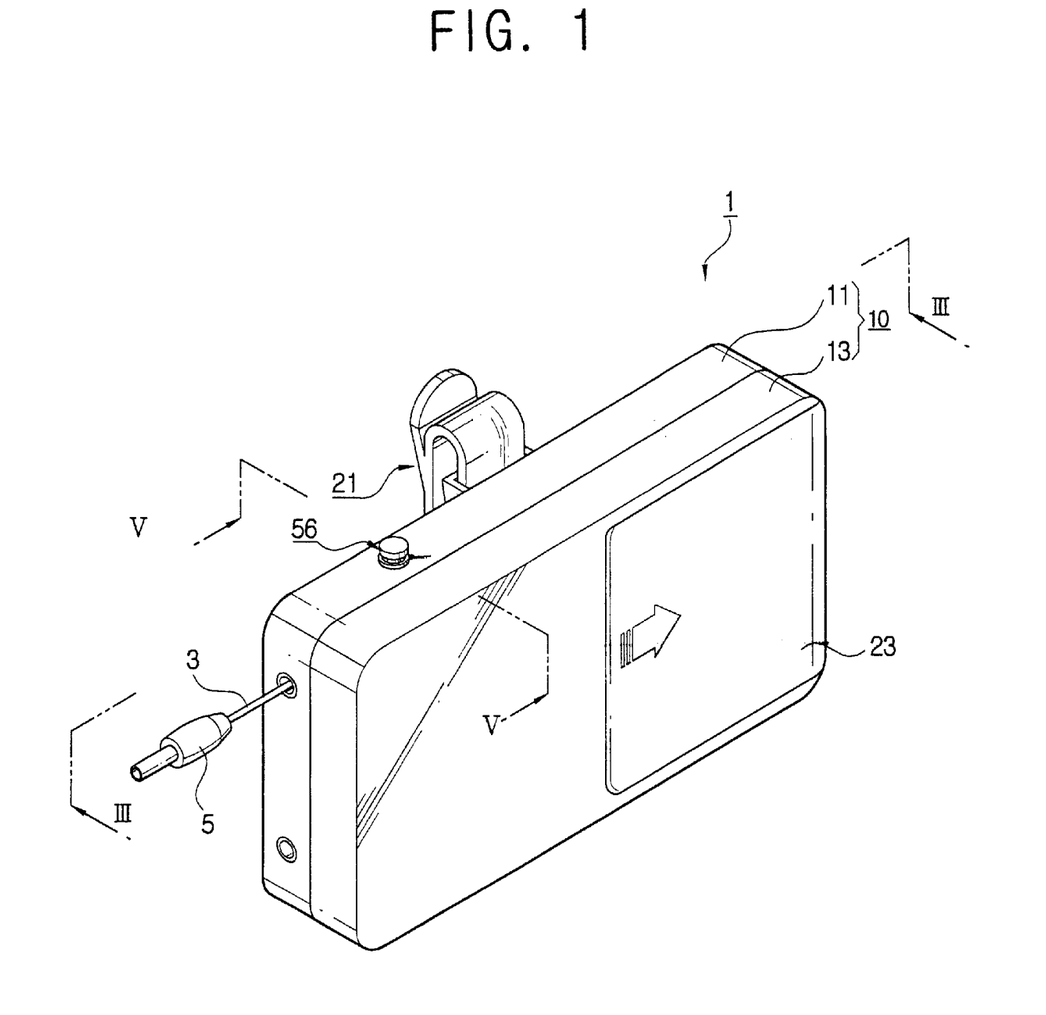
FIG. 1 is a perspective view of an apparatus for supplying auxiliary power to portable electronic devices according to the present invention.
Figure 2:
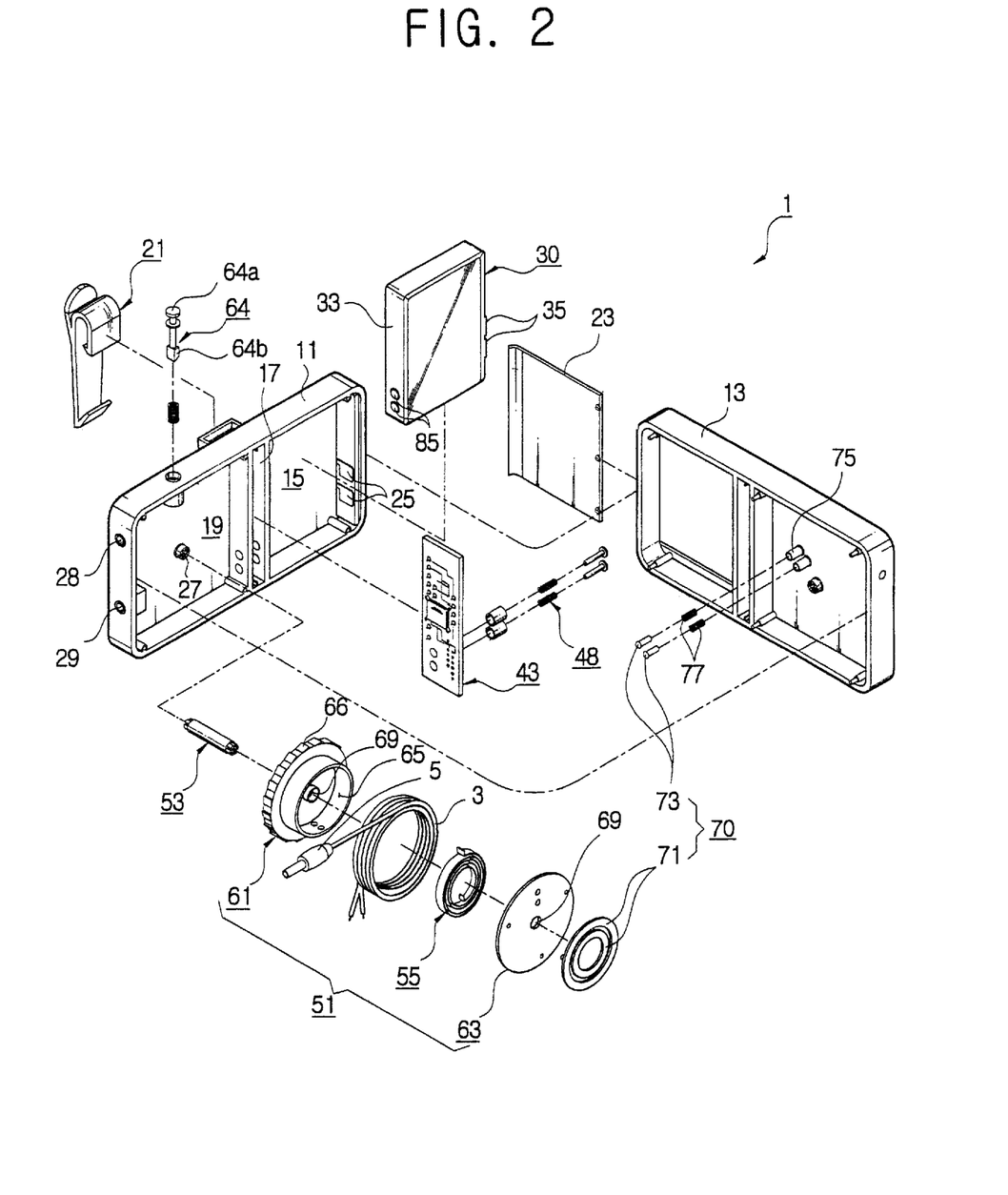
FIG. 2 is an exploded perspective view of the apparatus of FIG. 1.
Figure 3:
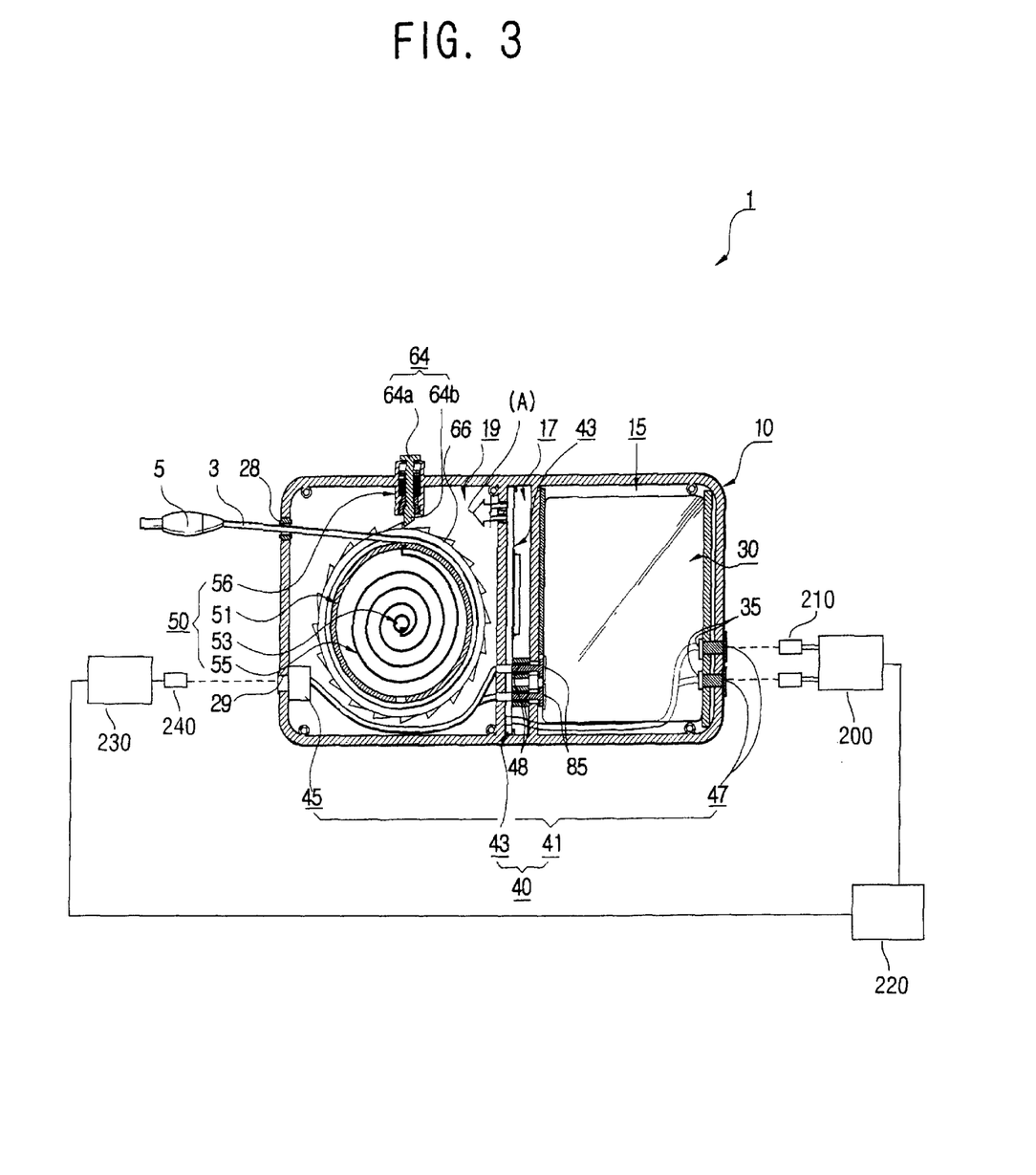
FIG. 3 is a sectional view of the apparatus in a winding state of an electric wire taken along line III—III of FIG. 1.
Figure 4:
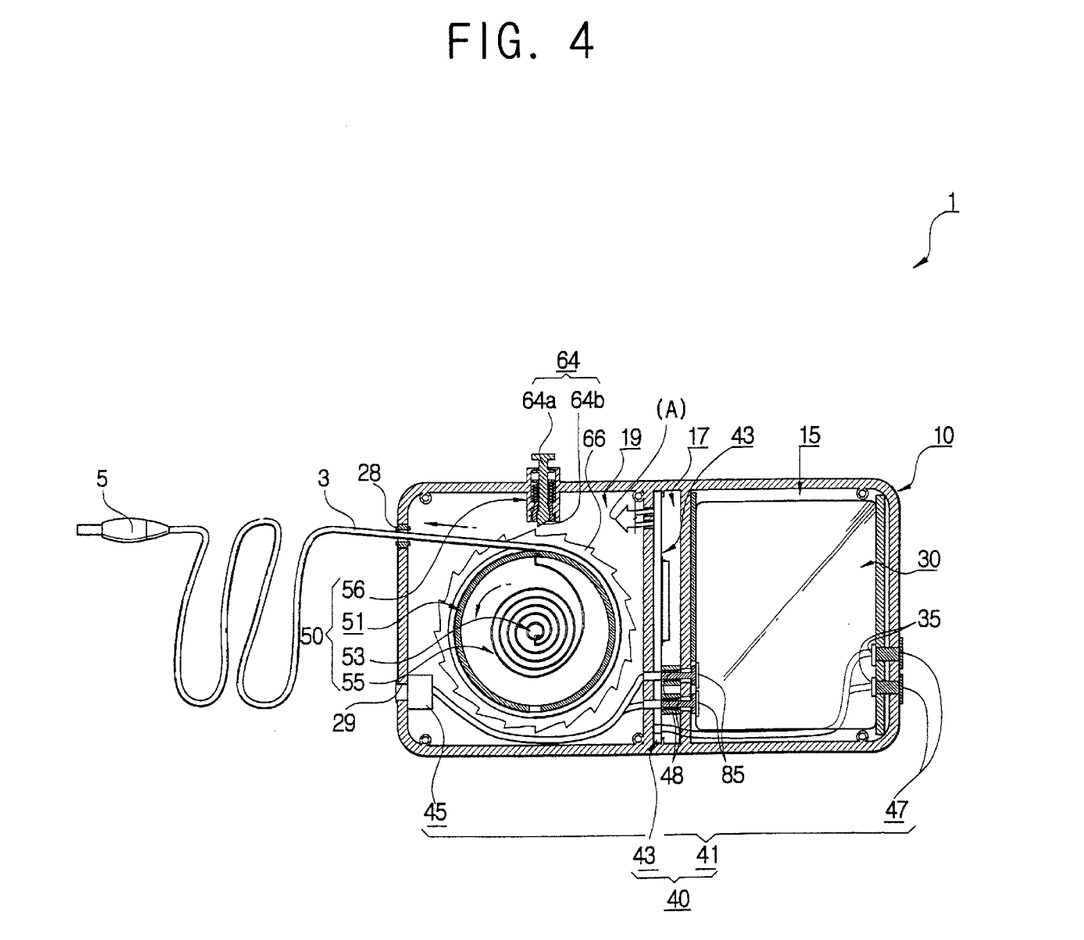
FIG. 4 is a sectional view of the apparatus in an unwinding state of the electric wire of FIG. 3.
Figure 5:
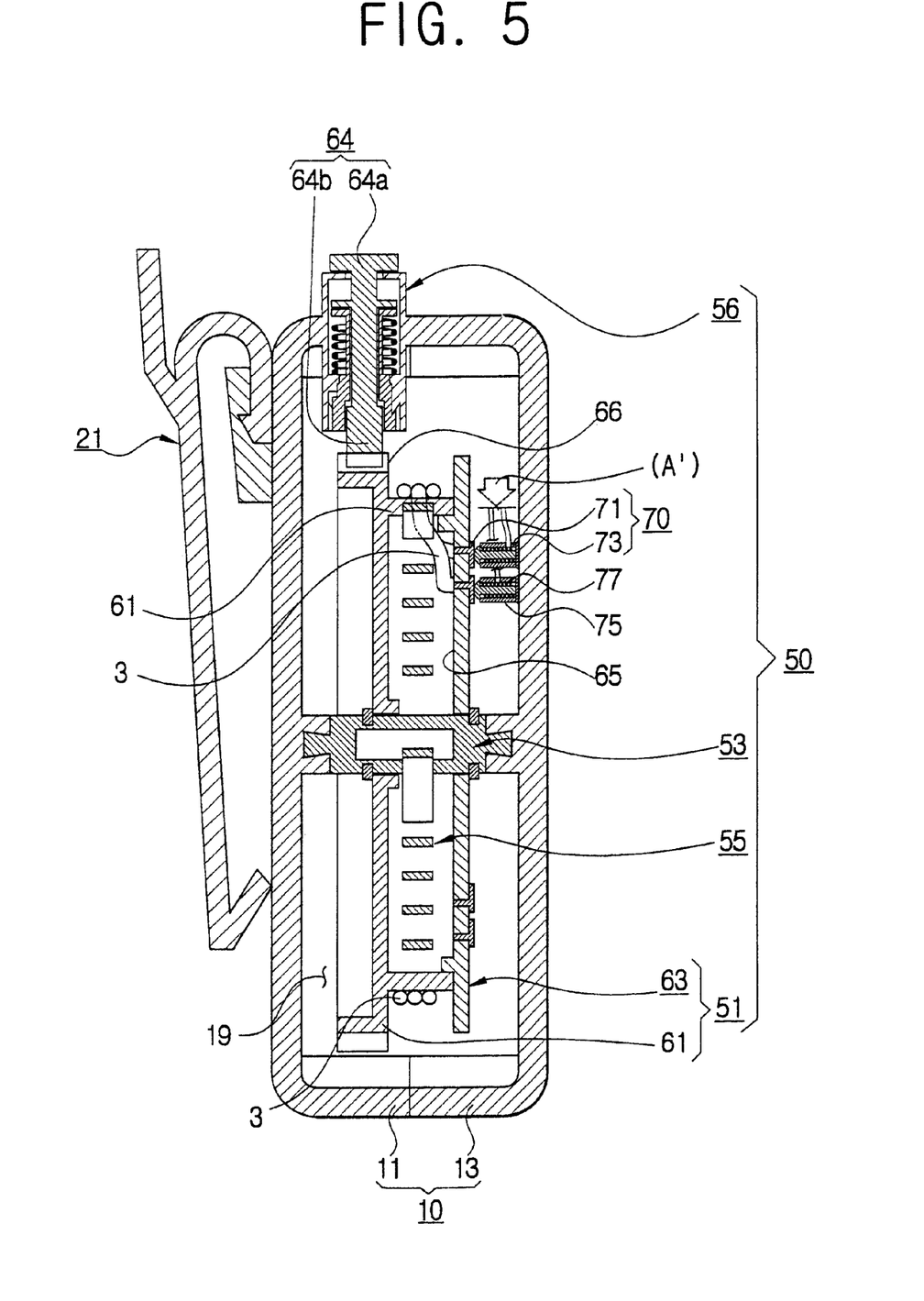
FIG. 5 is a sectional view taken along line V—V of FIG. 1.

The movable contacts 71 is of a pair of annular metal pieces concentrically coupled each other around the rotary shaft 53 on a planar surface of the winding member cover 63, and, as shown in FIG. 5, is electrically connected to the secured end of the electric wire 3 secured on the main body 61 of the winding member 51.

The secured contacts 73 constantly contact with the movable contacts 71 where it is electrically connected to the battery 31 through the charging circuit substrate 43. To this end, preferably, in the inside wall of the winding member accommodation part 19 corresponding to the movable contacts 71 are provided a pair of secured contact accommodation parts 75, and in each secured contact accommodation part 75 is provided a spring 77 elastically supporting the secured contact 73. The secured contacts 73 are, as depicted in A of FIGS. 3 and 4, and in A' of FIG. 5, electrically connected to the charging circuit substrate 43.

Accordingly, though the winding member is rotated, the secured contacts 73 are elastically contacted to the movable contacts 71 continuously, and therefore electric power from the battery 31 can be supplied to the portable electric device 100 through the electric wire 3.

Figure 7:
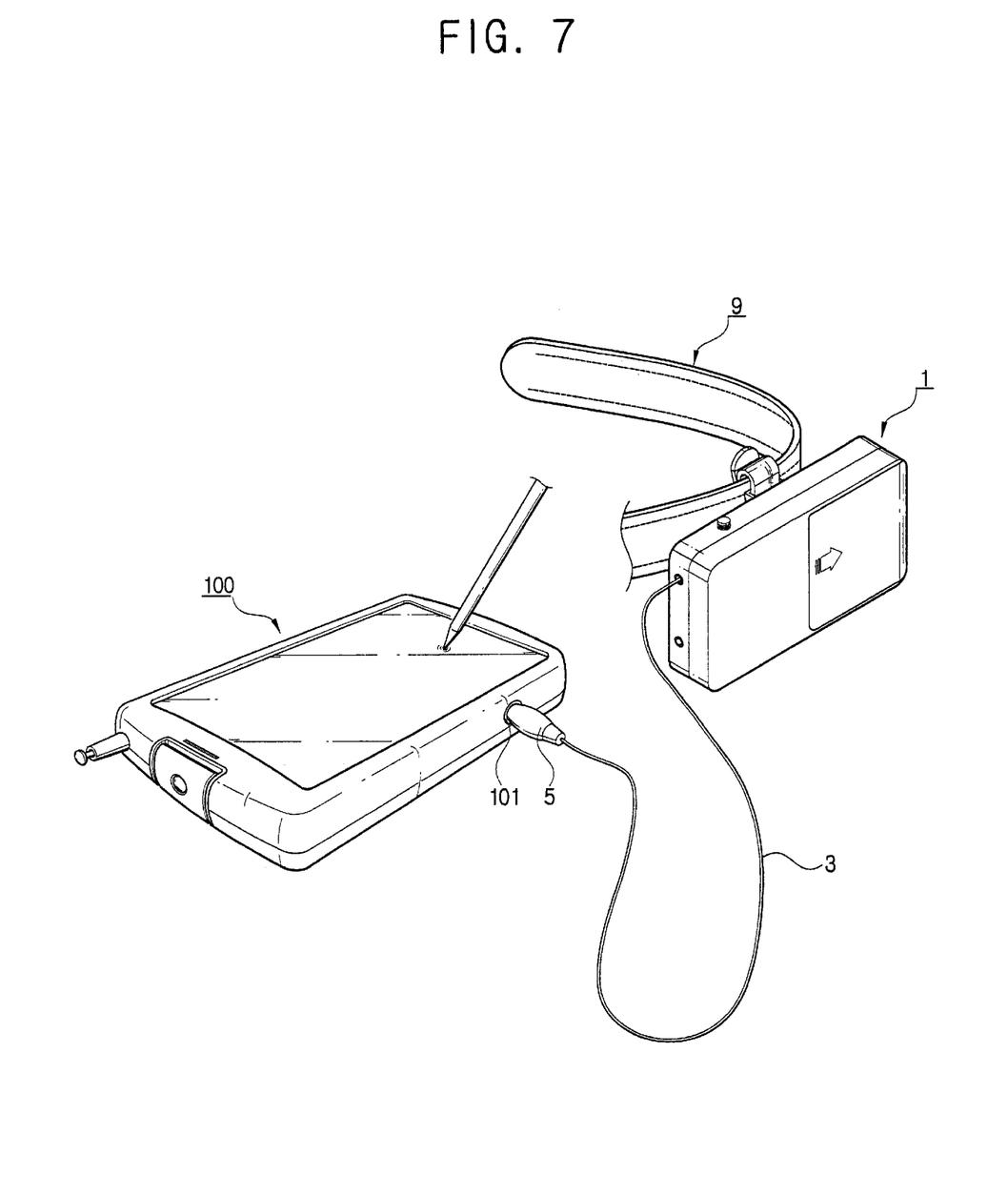
FIG. 7 is a perspective view showing a state of the apparatus of FIG. 1 when being used.

With this configuration, the apparatus 1 for supplying auxiliary power to the portable electric devices according to the present invention, as shown in FIG. 7, can be carried through the belt 9 by using the clip 21 combined outside the casing 10.

If the electric power of the main battery in the portable electric device 100 is discharged, the user draws out the electric wire 3 winded in the winding unit 50 from the casing 10 with a suitable length, and connects the connection jack 5 of the free end of the electric wire 3 with a jack join part 101 of the portable electric device 100.

Then, the charged electric power of the battery 31 in the auxiliary apparatus 1 is supplied to the portable electric device 100 through the electric wire 3 after passing through the contact terminals 85 of the battery 31, the contact members 48, the charging circuit substrate 43, the secured contacts 73, and the movable contacts 71. Therefore, a user can use the portable electric device 100 continually.

When the electric wire 3 is drawn out, the winding member 51 is rotated in the inverse direction against the winding direction. Then, the rotary spring 55 is compressed so as to have a restoring force. This restoring force of the rotary spring 55 allows the winding member 51 to be rotated in the winding direction.

At this time, for maintaining the drawn out electric wire 3, a user pushes the pushing part 64a of the brake button 64. Then, the stopper 64b of the brake button 64 catches the brake teeth 66 of the winding member 51, thereby preventing the winding member 51 from rotating in the winding direction and maintaining the drawn out electric wire 3.

In order to wind the electric wire 3 during the portable electric device 100 being not used, the user separates the connection jack 5 from the jack join part 101 of the portable electric device 100, and pushes the brake button 64. Then, the stopper 64b of the brake button 64 releases from the brake teeth 66, thereby making the winding member 51 rotate. Simultaneously, the compressed rotary spring 55 allows the winding member 51 to be rotated in the winding direction, by the restoring force. Then, the drawn out electric wire 3 is automatically wound on the winding member 51 inside the casing 10.

The auxiliary apparatus 1 for the portable electric device 100 according to the present invention can be charged by various manners.

First, if the electric power of the battery is entirely exhausted, a user opens the sliding cover 23 of the battery accommodation part 15, and picks out the battery pack 30. Thereafter, the user plugs the battery 31 in the separate charger 200 and charges the battery 31 with electric power in a general charging manner.

Further, it is possible to charge the battery 31 with electric power plugging the auxiliary apparatus 1 itself plugged in the separate charger 200, without picking out the battery pack 30. That is, if the auxiliary apparatus 1 is plugged in the separate charger 200, the charger connection terminals 47 outside the casing 10 contacts with the supply terminals 210 of the separate charger 200, and thus electric power is supplied to the battery 31. The battery 31 is charged with the supplied electric power through the contact terminals 35 of the battery pack 30.

It is also possible to charge the battery 31 with electric power using the AC (alternating current) adapter 230 connected with the external power source 220. That is, the battery 31 is charged with electric power by inserting the DC (direct current) jack 240 of the AC adapter 230 connected with the external power source 220 into the jack hole 29 so as to be connected with the adapter connection terminals 45. The battery 31 is charged with the supplied electric power through the contact terminals 35 of the battery pack 30 after passing through the charger 40.

Figure 8:
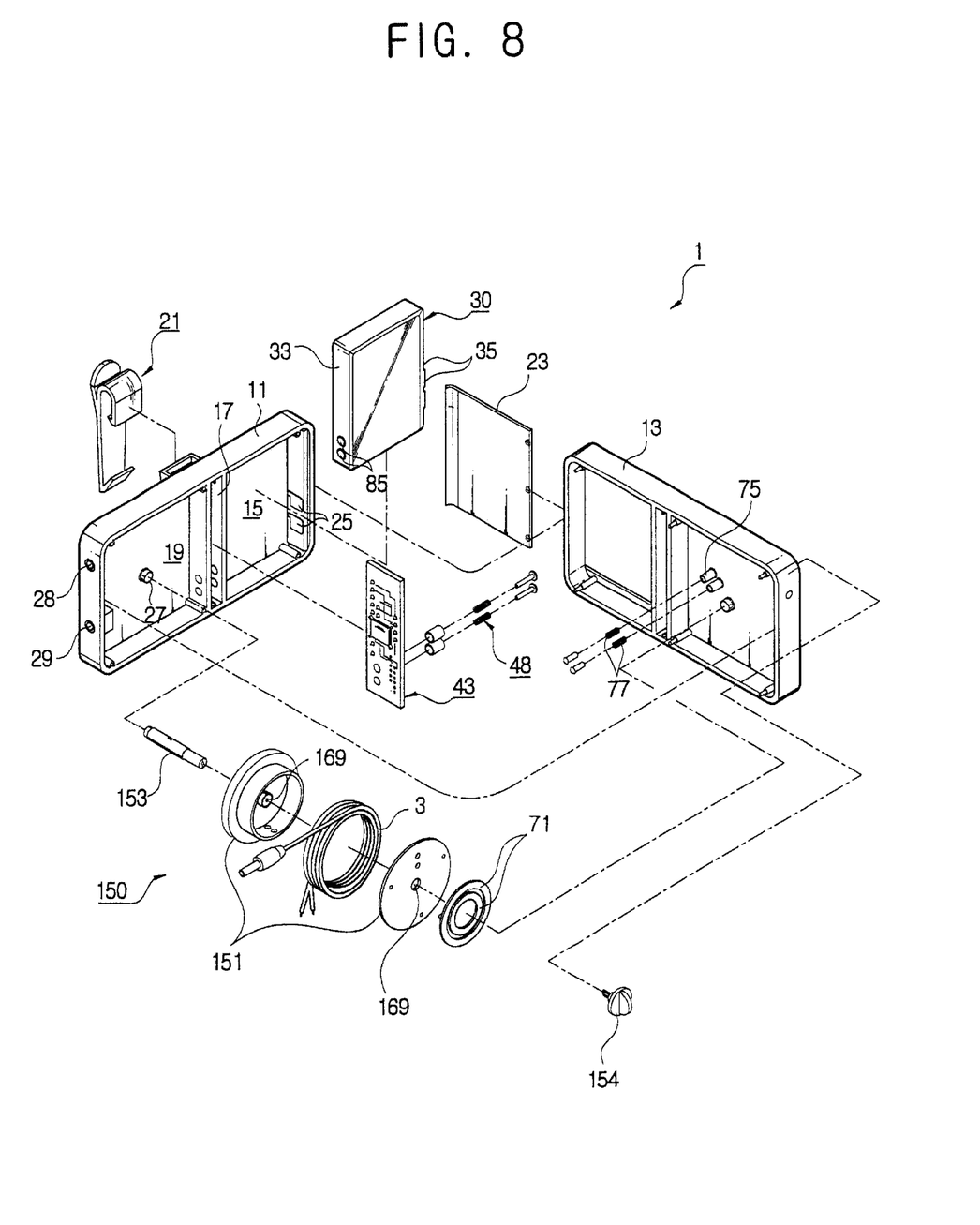
FIG. 8 is an exploded perspective view of an apparatus for supplying auxiliary power to portable electric devices according to another embodiment of the present invention.

FIG. 8 is an exploded perspective view of the apparatus for supplying auxiliary power to the portable electric devices according to another embodiment of the present invention. As illustrated therein, the apparatus for supplying auxiliary power to the portable electric device according to the present embodiment has a winding unit 150 having different components from the above-described embodiment. Therefore, a description of the same components will be omitted, and only the winding unit 150 will be described herein below. However, reference numerals of all parts except for the winding unit 150 is the same to the reference numerals of the apparatus 1 for supplying auxiliary power to the portable electric device in FIGS. 1 through 7.

The winding unit 150 according to the present embodiment includes the winding member 151 winding and unwinding the electric wire 3, a rotary shaft 153 by which the winding member 151 is rotated and supported, a rotary knob 154 rotating the winding member 151 forward and backward.

The winding member 151 is of a cylindrical form. The center of the winding member 151 is provided with a through hole 169 for the rotary shaft 153, and the cylindrical surface of the winding member 151 is grooved with a U-shape in order to prevent the electric wire from deviating.

The rotary shaft 153 passes through a through hole 169, being secured in the hole 169, and both end parts thereof are secured in the shaft receiving part 27 on both walls of the winding unit accommodation part 19. Accordingly, the rotary shaft 153 supports the winding member 151 to be rotated forward and backward.

The rotary knob 154 is protruded outward from the casing 10 in order to rotate the winding member 151, being coupled to one end of the rotary shaft 153.

With this configuration, when a user wants to supply electric power to the portable electric device 100, if the user pulls the electric wire 3 outward, the electric wire 3 is drawn out, rotating in the inverse direction against the winding direction. When the electric wire 3 is wound according to the portable electric device 100 being not used, the user directly rotates the rotary knob 154 in the winding direction so that the electric wire 3 is accommodated in the casing 10 by being wound on the winding member 151.

As described above, according to the apparatus for supplying auxiliary power to the portable electric devices according to the present invention, it is possible to supply electric power to the portable electric device without separating the battery by drawing out the electric wire and connecting it to the portable electric device when the main battery thereof is entirely exhausted by combining it with a belt, a pocket of clothes, or etc.

Additionally, the apparatus for supplying auxiliary power to the portable electric devices according to the present invention is convenient to carry by using the clip held on the belt or etc.

According to the present invention, there is provided an apparatus for supplying auxiliary power to portable electric devices, which can be promptly connected to the portable electric devices and supply electric power thereto, and is convenient to carry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for supplying auxiliary power to a portable electric device, comprising:
    a casing;
    a battery removably accommodated in said casing;
    a winding unit winding and unwinding an electric wire conveying electric power from said battery supplied to said portable electric device, rotating forward and backward in said casing; and
    a contact member provided in said winding unit, including a movable contact electrically connected to said electric wire, and a secured contact electrically connected to said battery and constantly contacted with said movable contact.

2. The apparatus according to claim 1, further comprising at least one power input part provided in said casing, receiving electric power from an external power source, and a charger including a charging circuit charging said battery with the electric power inputted to said power input part.

3. The apparatus according to claim 2, with said power input part, comprising:
    adapter connection terminals electrically connected to an adapter coupled with the external power source; and
    charger connection terminals exposed outside said casing, corresponding to power source terminals of a separate charger connected with the external power source.

4. The apparatus according to claim 3, with said adapter connection terminals electrically connected with said charger accommodating charging of said battery.

5. The apparatus according to claim 1, with said winding unit, further comprising:
    a cylindrical winding member winding said electric wire on said cylindrical winding member;
    a rotary shaft rotating and supporting said winding member;
    a rotary spring elastically restoring said winding member to the winding state; and
    a brake braking the elastic restoring rotation of said winding member.

6. The apparatus according to claim 1, with said winding unit, further comprising:
    a cylindrical winding member winding said electric wire on said cylindrical winding member;
    a rotary knob provided in one side of said winding member, protruding outward from said casing; and
    a rotary shaft rotating and supporting said winding member.

7. The apparatus according to claim 6, with said rotary knob rotating said winding member forward and backward.

8. The apparatus according to claim 1, further comprising a clip provided at said casing to secure said casing on a user.

9. The apparatus according to claim 1, with said secured contact elastically forming a continuous contact with said movable contact to form a constant electrical contact with said battery and said electric wire.

10. A method, comprising the steps of:
    winding and unwinding an electrical wire within a casing, said electrical wire conveying electrical power from a battery removably accommodated in a casing;
    continuously providing an electrical contact with said electrical wire and said battery while winding and unwinding said electrical wire; and coupling said electrical wire to a portable electric device to provide power to said portable electric device from said battery.

11. The method of claim 10, further comprising the step of receiving electrical power from an external power source to charge said battery.

12. The method of claim 11, with said step of receiving electrical power further comprised of the steps of:

receiving electrical power from an external power source; and charging said battery from the power source through a charger unit disposed in said casing.

13. The method of claim 11, with said step of receiving electrical power, further comprised of the step of receiving electrical power from an external charging unit to charge said battery.

14. The method of claim 10, with said step of winding and unwinding said electrical wire, further comprising the steps of:

winding said electric wire on a winding member;

rotating and supporting said winding member by a rotary shaft;

elastically restoring said winding member to the winding state by a resilient member; and braking the elastic restoring rotation of said winding member.

15. The method of claim 10, with said step of winding and unwinding said electrical wire, further comprising the steps of:

winding and unwinding said electric wire on a winding member;

controlling the winding and unwinding of said electrical wire by a rotary knob provided in one side of said winding member, protruding outward from said casing; and rotating and supporting said winding member by a rotary shaft.

16. The method of claim 15, further comprising the step of securing said casing on a user.

17. An apparatus, comprising:

a case;

a power storing unit removably accommodated in said case;

a winding unit accommodating a winding and unwinding of a wire conveying power from said power storing unit to an electric device;

a contact member in said winding unit, including a movable contact connected to said wire, and a secured contact connected to said power storing unit, said secured contact continuously contacted with said movable contact; and a power input part receiving power from an outside power unit to charge said power storing unit.

18. The apparatus of claim 17, further comprising:

a resilient member elastically restoring a winding member of said winding unit to an initial state; and a brake applied on a tooth of said winding member to brake the elastic restoring rotation of said winding member.

19. The apparatus of claim 17, further comprising a rotary knob coupled with said winding member and protruding outside of said case to accommodate the controlling of the winding and unwinding of said winding unit.

20. The apparatus of claim 17, further comprising a charging unit within said case to charge said power storing unit, said charging unit connected with said power input part accepting power from the outside power unit.

* * * * *